United States Patent
Mironets et al.

(10) Patent No.: US 11,498,125 B2
(45) Date of Patent: Nov. 15, 2022

(54) METHOD FOR FABRICATING COMPONENTS USING HYBRID ADDITIVE MANUFACTURING AND CONSOLIDATION PROCESS

(71) Applicant: Hamilton Sundstrand Corporation, Charlotte, NC (US)

(72) Inventors: Sergey Mironets, Szymanow OT (PL); Pawel Czarnecki, Swidnica (PL)

(73) Assignee: Hamilton Sundstrand Corporation, Charlotte, NC (US)

( * ) Notice: Subject to any disclaimer, the term of this patent is extended or adjusted under 35 U.S.C. 154(b) by 395 days.

(21) Appl. No.: 16/176,730

(22) Filed: Oct. 31, 2018

(65) Prior Publication Data
US 2020/0130059 A1 Apr. 30, 2020

(51) Int. Cl.
| | |
|---|---|
| *B22F 3/15* | (2006.01) |
| *B22F 3/24* | (2006.01) |
| *B22F 10/20* | (2021.01) |
| *B33Y 10/00* | (2015.01) |
| *B33Y 30/00* | (2015.01) |
| *B33Y 70/00* | (2020.01) |
| *B30B 11/00* | (2006.01) |
| *B22F 10/28* | (2021.01) |

(52) U.S. Cl.
CPC ............... *B22F 3/15* (2013.01); *B22F 3/24* (2013.01); *B22F 10/20* (2021.01); *B22F 10/28* (2021.01); *B22F 2003/153* (2013.01); *B22F 2003/247* (2013.01); *B22F 2201/10* (2013.01); *B30B 11/002* (2013.01); *B33Y 10/00* (2014.12); *B33Y 30/00* (2014.12); *B33Y 70/00* (2014.12)

(58) Field of Classification Search
CPC ............... B22F 3/15; B22F 2003/1058; B22F 2003/247; B22F 30/00; B33Y 10/00; B33Y 70/00
See application file for complete search history.

(56) References Cited

U.S. PATENT DOCUMENTS

| | | | |
|---|---|---|---|
| 2016/0243621 A1* | 8/2016 | Lucas | B22F 5/10 |
| 2016/0258298 A1* | 9/2016 | Channel | B22F 10/10 |

(Continued)

FOREIGN PATENT DOCUMENTS

| | | | | |
|---|---|---|---|---|
| EP | 0 863 806 B1 * | 7/2002 | | B22F 3/105 |
| EP | 2551040 A1 * | 1/2013 | | B22F 3/1055 |

(Continued)

OTHER PUBLICATIONS

M. V. Sundaram, "Processing Methods for Reaching Full Density Powder Metallurgical Materials", Thesis for the Degree of Licentiate of Engineering, Department of Materials and Manufacturing Technology, Chalmers University of Technology, Gothenburg, Sweden, 2017, 47 pages.

(Continued)

*Primary Examiner* — Alexandra M Moore
(74) *Attorney, Agent, or Firm* — Kinney & Lange, P.A.

(57) ABSTRACT

A method of fabricating a near net shape component includes forming a sacrificial shell from a pulverant material using an additive manufacturing process, the shell having an aperture. The method further includes filling the shell with a second pulverant material, subjecting the filled shell to a consolidation process, and removing the shell from the consolidated second pulverant material.

11 Claims, 3 Drawing Sheets

(56) References Cited

U.S. PATENT DOCUMENTS

2016/0279708 A1* 9/2016 Hann .................. B22F 3/15
2017/0291221 A1 10/2017 Swank et al.
2020/0086555 A1* 3/2020 Marchione ............ B22F 3/1055

FOREIGN PATENT DOCUMENTS

| EP | 2551040 A1 | 1/2013 |
| EP | 3064295 A1 | 9/2016 |
| EP | 3072611 A2 | 9/2016 |
| WO | WO2015/057761 A1 | 4/2015 |

OTHER PUBLICATIONS

Extended European Search Report for EP Application No. 19206218.0, dated Dec. 9, 2019, 9 pages.
Communication Pursuant to Article 94(3) EPC for EP Application No. 19206218.0, dated Jan. 22, 2021, 7 pages.

* cited by examiner

METHOD FOR FABRICATING COMPONENTS USING HYBRID ADDITIVE MANUFACTURING AND CONSOLIDATION PROCESS

BACKGROUND

Powder bed fusion techniques can be used to create metallic components having complex geometries. However, the build powder can become contaminated during these processes due to impurities (e.g., $O_2$, $N_2$, Si, C) in particles ejected from the melt pool and end up with the feedstock. These impurities can be incorporated into the component during manufacturing and can result reduced mechanical properties in the component. Such a result is undesirable particularly in components subject to high thermal and mechanical stresses.

SUMMARY

A method of fabricating a near net shape component includes forming a sacrificial shell from a pulverant material using an additive manufacturing process, the shell having an aperture. The method further includes filling the shell with a second pulverant material, subjecting the filled shell to a consolidation process, and removing the shell from the consolidated second pulverant material.

A system for fabricating a component includes a sacrificial shell formed from a first material and having an aperture, a second, pulverant material contained within the hollow shell, and means for consolidating the second material within the hollow shell.

DETAILED DESCRIPTION

A method of forming net shape (i.e., final) or near net shape (i.e., near final) components is disclosed herein. The method includes additively manufacturing a sacrificial shell with a geometry generally complementary to the desired component. The shell includes integral ports through which any contaminated or unused powder from the additive manufacturing process can be evacuated. A highly-pure pulverant material can be added to the shell through one or more of the ports, and the filled shell can subsequently undergo a high temperature and/or high pressure consolidation process, after which, the shell can be removed. The resulting component can include complex geometries, and also can be near 100% theoretical density with a generally homogenous microstructure.

Figure 1:
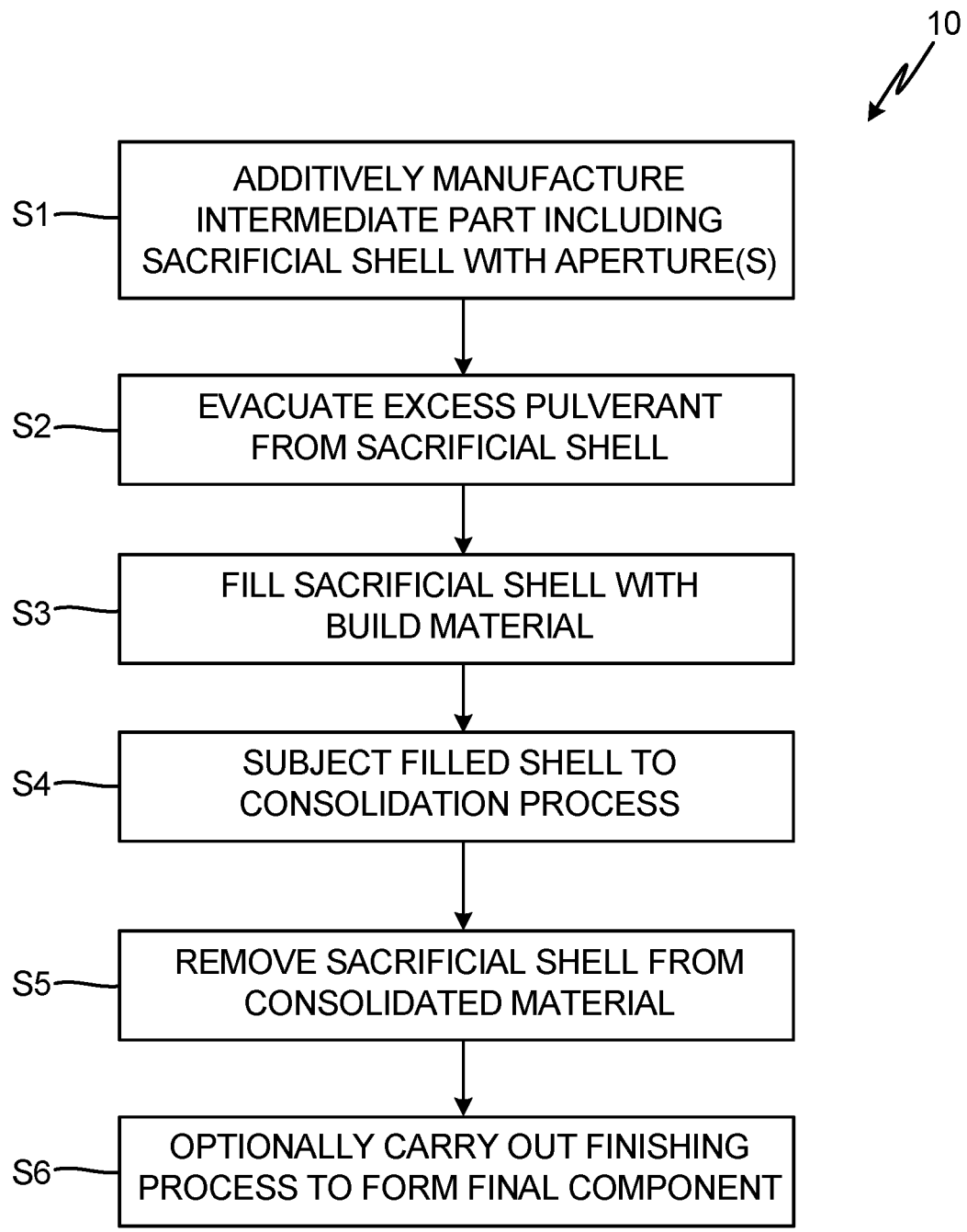
FIG. 1 is a flow chart illustrating steps of forming a component using a sacrificial shell.
Figure 2:
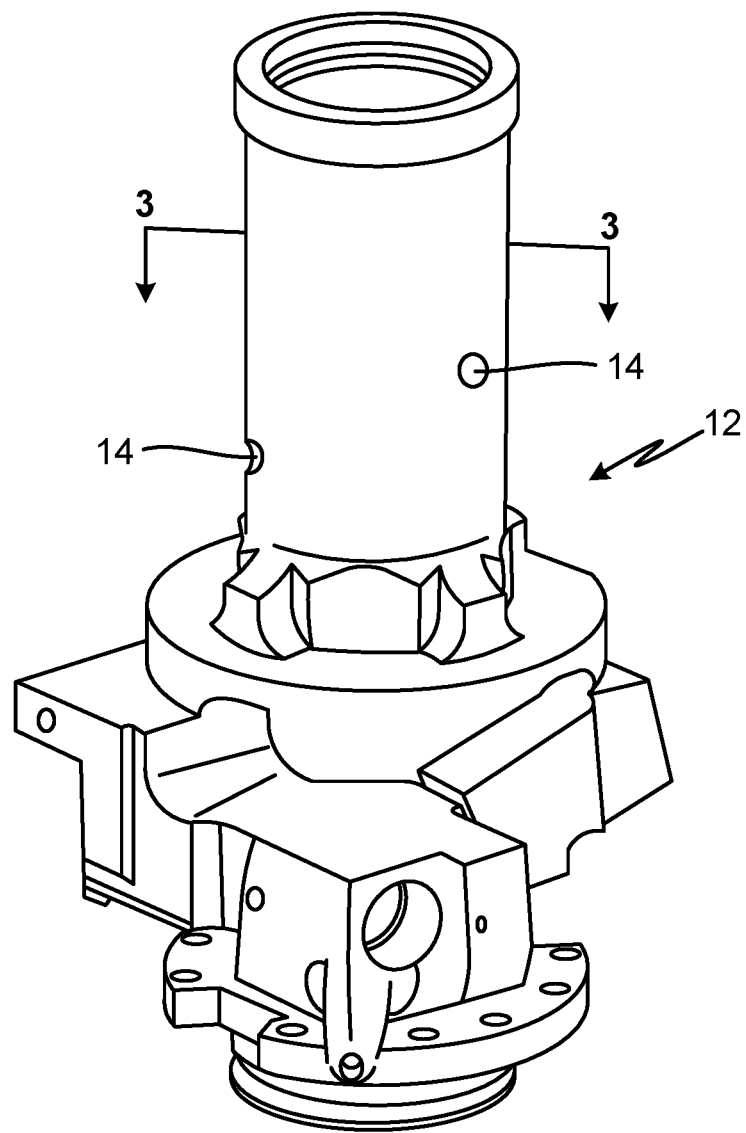
FIG. 2 is a simplified illustration showing elements of a system for fabricating the component, including the sacrificial shell filled with a pulverant build material.
Figure 3:
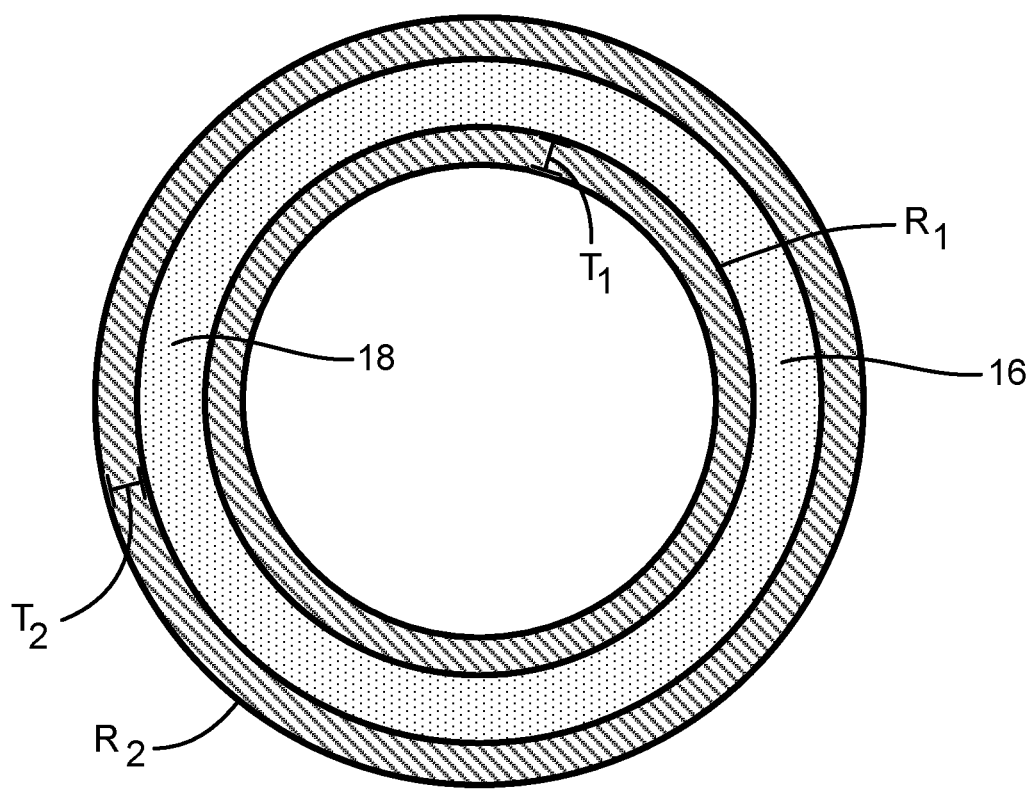
FIG. 3 is cross-sectional view of the shell and build material of FIG. 2.

FIG. 1 is a flow diagram illustrating steps of method 10, used to produce a high-temperature and/or high-strength component. FIG. 2 illustrates a sacrificial shell filled with a pulverant build material, and FIG. 3 is a cross-sectional view of the elements shown in FIG. 2. With continued reference to FIGS. 1-3, at step S1, an intermediate part, which in an exemplary embodiment is a sacrificial shell 12, is fabricated. Shell 12 can be formed using an additive manufacturing process, such as a powder bed fusion technique (e.g., selective laser melting, selective laser sintering, electron beam melting, etc.), or another process suitable for forming shell 12 from a metallic powder. Exemplary metallic powders can include, for example, alloys of aluminum, nickel, and titanium. Shell 12 can be formed to include one or more apertures 14 fluidly connecting an inner portion 16 of shell 12 with the external environment. Shell 12 can further be formed to have a geometry complementary to that of the desired component, which in the embodiment shown in FIG. 2 is a ram air turbine (RAT) outer cylinder.

As shown in FIG. 3, shell 12 can include a first region $R_1$ having a first thickness $T_1$ and a second region $R_2$ having a second thickness $T_2$. Although shown as separate, concentric circles, the various regions in an alternative embodiment can be disposed along the same wall or surface. In some embodiments shell 12 can be formed with a uniform thickness such that $T_1=T_2$, however, in alternative embodiments, $T_1 \neq T_2$ (e.g., $T_2$ is greater than $T_1$). Such an embodiment can be advantageous to accommodate shell deformation during the consolidation process, as is discussed in detail below. Additional varied thickness regions (i.e., $R_3 \ldots R_N$) can be included as necessary to facilitate component fabrication. Shell 12 can be designed to have the minimum thickness required to withstand the consolidation process at step S3. In some embodiments, the minimum thickness of shell 12 can range from 75 µm to 120 µm, while in other embodiments, the minimum thickness can be as great as 1 mm. Greater and lesser shell thicknesses are contemplated herein.

At step S2, any excess powder trapped within inner portion 16 of shell 12 can be evacuated through apertures 14 by applying, for example an air stream or a vacuum to one or more of the apertures. At step S3, shell 12 can be filled with an amount of pulverant material 18 that will form the completed component. Pulverant material 18 can be one or a mixture of a metallic, intermetallic, and/or metal matrix composite (MMC) materials. Exemplary materials can include "non-weldable" materials (i.e., materials susceptible to cracking during diffusion welding processes) such as Al 6061, Al 7075, IN 100, and high carbon steel, to name a few non-limiting examples. Pulverant material 18 can also include a weldable material, similar to what would be suitable to manufacture shell 12. The amount of pulverant material 18 added to shell 12 can depend on such factors as desired component geometry and density, as well as the consolidation process parameters, as is discussed in detail below.

Once filled with the desired amount of pulverant material 18, shell 12 can be vibrated to more evenly distribute and increase the apparent density of pulverant material 18. In an exemplary embodiment, apertures 14 can also be sealed (after the addition of pulverant material 18) with a plug or other sealing means to form an air-tight shell 12. The sealing means can be permanent, removable, or a combination of the two throughout shell 12, depending on the application. In some cases, after vibrating shell 12 containing an amount of pulverant material 18, additional pulverant material can be added, if desired. Successive fill and vibrate steps can be repeated until the desired pulverant apparent density and fill level is reached. In such cases, one or more removable sealing means may be advantageous in order to continue to add pulverant material 18, but also to retain the added material during vibration.

At step S4, shell 12 filled with pulverant material 18 can be subjected to a consolidation process performed at a high temperature and/or high pressure. Exemplary processes can include hot isostatic pressing (HIP) and a lower temperature variation. For the HIP process, filled shell 12 can be placed in a suitable HIP assembly (e.g., a high-temperature furnace within a pressure vessel) and subjected to elevated temperatures while an inert gas applies isostatic pressure to shell 12 from all sides for a predetermined time period. Alternatively, filled shell 12 can be preheated in a furnace and subsequently exposed to a relatively higher pressure (e.g., 2-3× higher) for a shorter duration as compared to the HIP process. The latter process can be advantageous for high-volume production, because the consolidation can occur in an open-air environment, and because the process generally takes less time to carry out.

During the consolidation process, exposure to high temperatures and pressure can cause shell 12 to deform as the pulverant material 18 contained inside densifies. Shell 12 can therefore be designed to include features that facilitate desired deformation, such as the varied shell thicknesses discussed above. Such features might additionally or alternatively include external stiffening elements (not shown). The microstructure of pulverant material 18 can also be specifically selected based on the consolidation process being used, and/or the desired density of the component. For example, pulverant material 18 containing mostly spherical particles can be more compressible than a dendritic pulverant material 18.

At step S5, shell 12 can, in an exemplary embodiment, be removed from the consolidated material 18 (i.e., the component). The removal of shell 12 can be carried out using a chemical process (e.g., etching) in which the component and shell are immersed in or otherwise exposed to a chemical solution for predetermined duration. The material used to form shell 12, the thickness of shell 12, and the chemical composition of the solution can all influence the time needed to achieve removal of shell 12. The component can additionally or alternatively undergo a mechanical removal process, such as cutting, milling, or grinding to remove shell 12. At step S6, the component can undergo additional post-processing steps (e.g., polishing, coating, etc.) if necessary to achieve a desired surface finish, thermal, and/or mechanical properties.

In an alternative embodiment, the component can be formed using only a partial shell structure, such that the intermediate part formed at step S1 includes a solid portion and a sacrificial shell. For example, shell 12 of FIG. 2 can be limited to only the upper cylindrical portion of the desired RAT outer cylinder, while the lower base portion can be solidly formed using additive manufacturing. In operation, the solid base portion and upper shell portion can be formed during the same additive manufacture process. The shell portion would then be evacuated, filled with pulverant material 18, subjected to consolidation, then removed as described above regarding shell 12. Such a method may be desirable where one portion of a part requires fine or complex features better achieved through additive manufacturing, while another portion requires the microstructure and improved mechanical properties better achieved through a consolidation process.

The disclosed methods can be used to fabricate components at or near 100 percent theoretical density and with improved mechanical properties due to the homogeneous microstructure. Because the sacrificial shells can be manufactured in a variety of shapes and sizes, the method can be used to form components for almost any industry. The method is particularly advantageous in aerospace applications, because many aerospace components are exposed to high operating temperatures and high cycle fatigue.

Discussion of Possible Embodiments

The following are non-exclusive descriptions of possible embodiments of the present invention.

A method of fabricating a near net shape component includes forming a sacrificial shell from a pulverant material using an additive manufacturing process, the shell having an aperture. The method further includes filling the shell with a second pulverant material, subjecting the filled shell to a consolidation process, and removing the shell from the consolidated second pulverant material.

The method of the preceding paragraph can optionally include, additionally and/or alternatively, any one or more of the following features, configurations and/or additional components:

The above method can further include evacuating any remaining first pulverant material from the shell prior to filling the shell with the second pulverant material.

In any of the above methods, the first pulverant material can be evacuated through the aperture.

In any of the above methods, filling the shell with the second pulverant material can include adding the second pulverant material through the aperture.

Any of the above methods can further include sealing the aperture after filling the shell with the pulverant material.

Any of the above methods can further include vibrating the shell to distribute the pulverant material within the shell.

In any of the above methods, removing the shell can include a process selected from the group consisting of chemical etching, cutting, milling, grinding, and combinations thereof.

In any of the above methods, the consolidation process can be an isostatic pressing process.

In any of the above methods, the shell can have an inner surface geometry complementary to a component geometry.

In any of the above methods, the first material can be different from the second material.

In any of the above methods, the shell can further be formed having a first region with a first shell thickness, and a second region with a second shell thickness different from the first shell thickness.

Any of the above methods can further include using the additive manufacturing process to form a solid component portion from the first pulverant material, the solid component portion being integral to the sacrificial shell.

A system for fabricating a component includes a sacrificial shell formed from a first material and having an aperture, a second, pulverant material contained within the hollow shell, and means for consolidating the second material within the hollow shell.

The system of the preceding paragraph can optionally include, additionally and/or alternatively, any one or more of the following features, configurations and/or additional components:

The above system can further include means for removing the hollow shell from the consolidated second material.

In any of the above systems, the means for consolidating the second material can be an isostatic pressing process.

In any of the above systems, the first material can be different from the second material.

In any of the above systems, the shell can include a first region with a first shell thickness, and a second region with a second shell thickness different from the first shell thickness.

In any of the above systems, the shell can have an inner surface geometry complementary to a component geometry.

Any of the above systems can further include a solid component portion formed from the first material and integral to the sacrificial shell.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of fabricating a near net shape component, the method comprising:
   forming a solid base portion from a first pulverant material using an additive manufacturing process;
   forming, onto the solid base portion, a shell as a sacrificial container from the first pulverant material using the additive manufacturing process, the shell comprising an aperture;
   filling the shell with a second pulverant material;
   subjecting the shell, filled with the second pulverant material, to a consolidation process; and
   removing the shell from the consolidated second pulverant material.

2. The method of claim 1 and further comprising: evacuating any remaining first pulverant material from the shell prior to filling the shell with the second pulverant material.

3. The method of claim 2, wherein the first pulverant material is evacuated through the aperture.

4. The method of claim 1, wherein filling the shell with the second pulverant material comprises adding the second pulverant material through the aperture.

5. The method of claim 4 and further comprising: sealing the aperture after filling the shell with the second pulverant material.

6. The method of claim 5 and further comprising: vibrating the shell to distribute the second pulverant material within the shell.

7. The method of claim 1, wherein removing the shell comprises a process selected from the group consisting of chemical etching, cutting, milling, grinding, and combinations thereof.

8. The method of claim 1, wherein the consolidation process is an isostatic pressing process.

9. The method of claim 1, wherein the first pulverant material is different from the second pulverant material.

10. The method of claim 1, wherein the shell is further formed having a first region with a first shell thickness, and a second region with a second shell thickness different from the first shell thickness.

11. The method of claim 1, wherein the additive manufacturing process is a powder bed fusion process.

* * * * *